(12) United States Patent
Venkatasubramanian

(10) Patent No.: US 8,694,238 B2
(45) Date of Patent: Apr. 8, 2014

(54) AUTOMATED GROUND HANDLING OF AIRCRAFT

(75) Inventor: Sathya Vagheeswar Venkatasubramanian, Pittsburgh, PA (US)

(73) Assignee: Bombardier Transportation GmbH, Berlin (DE)

( * ) Notice: Subject to any disclaimer, the term of this patent is extended or adjusted under 35 U.S.C. 154(b) by 0 days.

(21) Appl. No.: 13/352,755

(22) Filed: Jan. 18, 2012

(65) Prior Publication Data

US 2013/0184977 A1 Jul. 18, 2013

(51) Int. Cl.
*G08G 5/06* (2006.01)

(52) U.S. Cl.
USPC .......... 701/301; 701/517; 701/117; 701/120; 701/23; 340/961; 244/50; 342/29

(58) Field of Classification Search
None
See application file for complete search history.

(56) References Cited

U.S. PATENT DOCUMENTS

| | | | |
|---|---|---|---|
| 3,958,218 A * | 5/1976 | Bateman | 340/970 |
| 6,393,362 B1 * | 5/2002 | Burns | 701/301 |
| 6,600,992 B2 * | 7/2003 | Dow | 701/23 |
| 8,121,786 B2 * | 2/2012 | Morbey et al. | 701/300 |
| 2009/0043462 A1 * | 2/2009 | Stratton et al. | 701/50 |
| 2009/0164122 A1 * | 6/2009 | Morbey et al. | 701/301 |
| 2009/0192710 A1 * | 7/2009 | Eidehall et al. | 701/301 |
| 2009/0261197 A1 * | 10/2009 | Cox et al. | 244/50 |
| 2010/0219988 A1 * | 9/2010 | Griffith | 340/961 |
| 2011/0010023 A1 * | 1/2011 | Kunzig et al. | 701/2 |
| 2011/0015816 A1 * | 1/2011 | Dow et al. | 701/23 |
| 2011/0093134 A1 * | 4/2011 | Emanuel et al. | 701/2 |

* cited by examiner

*Primary Examiner* — Helal A Algahaim
*Assistant Examiner* — Paul Castro
(74) *Attorney, Agent, or Firm* — The Webb Law Firm

(57) ABSTRACT

In a system and method of navigating a plurality vehicles consisting of one or more standalone tugs, or one or more tug propelled aircraft, or some combination thereof on the grounds of an airport, a virtual safety zone is electronically defined around each vehicle. Movement of each vehicle on the grounds of an airport is controlled based on the virtual safety zones defined around the plurality of vehicles.

30 Claims, 3 Drawing Sheets

AUTOMATED GROUND HANDLING OF AIRCRAFT

BACKGROUND OF THE INVENTION

1. Field of the Invention

The present invention relates to ground handling of aircraft in an airport and, more specifically, to the controlled automated movement of aircraft from gate to takeoff and/or, upon landing, arriving at the gate.

2. Description of Related Art

Air transportation today is a complicated logistical operation. It involves the interaction of multiple systems, some together with each other, and others in a specific sequence. The challenges of air travel begin from the moment a passenger steps out the door. Thanks to new and cumbersome security regulations, passengers are required to arrive early to an airport, travel with lesser and lesser bags, and travel for longer durations (including longer waiting times). For international passengers, the challenge is worsened because they are required to go through multiple transit points, requiring multiple security checks.

Passengers are not alone in living out the challenges of air travel. Also included are airline operators, the airports themselves, and the scores of people involved at each stage of operation and in between.

Aircraft ground handling typically includes aircraft guidance (to and from a gate), catering services, baggage services, aircraft maintenance services, and fueling. While the operation of an aircraft during flight is already optimized, there is a need for optimization during the time the aircraft is on the ground. Today, airlines are working to speed up turn-around time in an effort to get higher flight times. However, there is still one area where the airlines do not have much control—taxi time.

Presently, when an aircraft leaves the gate for takeoff, ground handling services manually guide the aircraft to the taxiway using tugs and human interfaces. This operation is made in close contact with ground support personnel and ground traffic control centers at the airport. It is in the airlines' and the airports' best interest to get an aircraft quickly to flight since the aircraft generates revenue only when it is in the air. However, the reality is that many times, a departing flight spends considerable amount of time on the taxiway, burning precious fuel, stressing ground traffic controllers, pilots, and passengers.

Additionally, other effects of constant revving up and revving down of engines during taxiing to and from a runway include: (a) increased fuel consumption; (b) increased engine use leading to reduced availability for revenue generating operation; (c) possible foreign object damage to surrounding aircraft and personnel; and (d) increased noise levels in and around the vicinity of the airport.

Therefore, there is a need for an improved and automated ground handling system and method that overcomes the above drawbacks and others while optimizing the resources and cost of operation for airports, airlines, and passengers.

SUMMARY OF THE INVENTION

The invention is a method of navigating a plurality vehicles consisting of one or more standalone tugs, or one or more tug propelled aircraft, or some combination thereof on the grounds of an airport. The method comprises: (a) electronically defining around each vehicle a virtual safety zone; and (b) electronically controlling movement of each vehicle on the grounds of an airport based on the virtual safety zones defined around the plurality of vehicles.

Each vehicle consisting of a tug propelled aircraft can be formed by mechanically coupling a tug having a tug virtual safety zone to an aircraft to form said vehicle having the electronically defined virtual safety zone of step (a) theraround.

The method can further include electronically defining a virtual safety zone around one or more assets of the airport, wherein step (b) further includes electronically controlling movement of each vehicle on the grounds of an airport based on the virtual safety zone defined around each of the one or more assets of the airport. Each asset of the airport can include one of the following: a building, a structure, a fence, a wall, a gate, or some combination thereof.

At least one dimension of at least one virtual safety zone defined around a vehicle can change based on a speed of said vehicle.

Step (b) can include electronically controlling movement of each vehicle to avoid overlap of virtual safety zones of two or more vehicles.

The method can further include: (c) electronically determining when the virtual safety zones of two vehicles overlap; and (d) in response to step (c), electronically controlling said vehicles having the overlapping virtual safety zones to avoid physical contact.

Step (b) can include electronically controlling movement of the plurality of vehicles from a central control location based on position data, movement data, or both of the plurality of vehicles.

Step (b) can include each vehicle electronically controlling its movement based on position data, movement data, or both of at least one other vehicle received from a central control location.

Each virtual safety zone can have the same dimensions. Alternatively, at least one dimension of the virtual safety zone around each vehicle can be based on at least one dimension of the vehicle.

Each virtual safety zone can be an electronically defined two-dimensional virtual space around the vehicle.

The virtual safety zone around each vehicle can electronically move with movement of the vehicle.

The invention is also a method of navigating a plurality of vehicles consisting of one or more standalone tugs, one or more tug propelled aircraft, or some combination thereof on the grounds of an airport. The method comprises: (a) electronically defining a virtual safety zone around each of a plurality of vehicles; (b) electronically monitoring position, movement, or both of each vehicle on the grounds of an airport; and (c) controlling movement of the plurality of vehicles on the grounds of the airport based on the electronically monitored position, movement, or both of each vehicle on the grounds of the airport in step (b) to avoid overlap of two or more virtual safety zones.

Step (a) can include electronically defining a virtual safety zone around an asset of the airport. Step (c) can include controlling movement of the plurality of vehicles on the grounds of the airport based on the electronically defined virtual safety zone around the asset of the airport. The asset of the airport can include: a building, a structure, a fence, a wall, a gate, or some combination thereof.

At least one dimension of at least one virtual safety zone defined around a vehicle can change based on a speed of said vehicle.

Step (c) can include either: movement of the plurality of vehicles being controlled from a central location; or each vehicle controlling its movement based on the position, the movement, or both of at least one other vehicle received from a central location.

Step (b) can include electronically monitoring from a central location.

The method can further include: (d) in response to two virtual safety zones overlapping, the two vehicles associated with the two overlapping virtual safety zones moving so that the two virtual safety zones become non-overlapping.

Each virtual safety zone can have the same dimensions. Alternatively, at least one dimension of the virtual safety zone around each vehicle can be based on at least one dimension of the vehicle.

Lastly, the invention is a system for navigating vehicles consisting of one or more standalone tugs, one or more tug propelled aircraft, or some combination thereof on the grounds of an airport. The system comprises: a plurality of vehicles, each vehicle including a position receiver, a radio transceiver and a controller that is operative for causing position data output by the position receiver to be radio transmitted by the radio transceiver; and a central controller operative for receiving the position data that is radio transmitted by the radio transceiver of each vehicle, wherein movement of each of the plurality of vehicles is controlled by the central controller, the controller of said vehicle, or both based on the radio transmitted position data received by the central controller from said plurality of vehicles and based on a virtual safety zone electronically defined around each vehicle.

The movement of each of the plurality of vehicles can be further controlled based on a virtual safety zone electronically defined around one or more assets of the airport. Each asset can include: a building, a structure, a fence, a wall, a gate, or some combination thereof.

At least one dimension of at least one virtual safety zone defined around a vehicle can change based on a speed of said vehicle.

The virtual safety zone around each vehicle can be electronically defined by the central controller.

Also or alternatively, the controller of each vehicle can electronically define the virtual safety zone around said vehicle and cause information regarding said virtual safety zone to be radio transmitted by the radio transceiver. The central controller can be operative for receiving the virtual safety zone data that is radio transmitted by the radio transceiver of the vehicle.

Each virtual safety zone can be represented by a two-dimensional space around the vehicle.

At least one dimension of the virtual safety zone around each vehicle can be based on at least one dimension of the vehicle.

The movement of each of the plurality of vehicles is controlled to avoid overlap of two or more virtual safety zones.

The movement of each of the plurality of vehicles is controlled whereupon, in response to two virtual safety zones overlapping, the two vehicles associated with the overlapping virtual safety zones move such that the two virtual safety zones become non-overlapping.

DETAILED DESCRIPTION OF THE INVENTION

The present invention will be described with reference to the accompanying figures where like reference numbers correspond to like elements.

Figure 1:
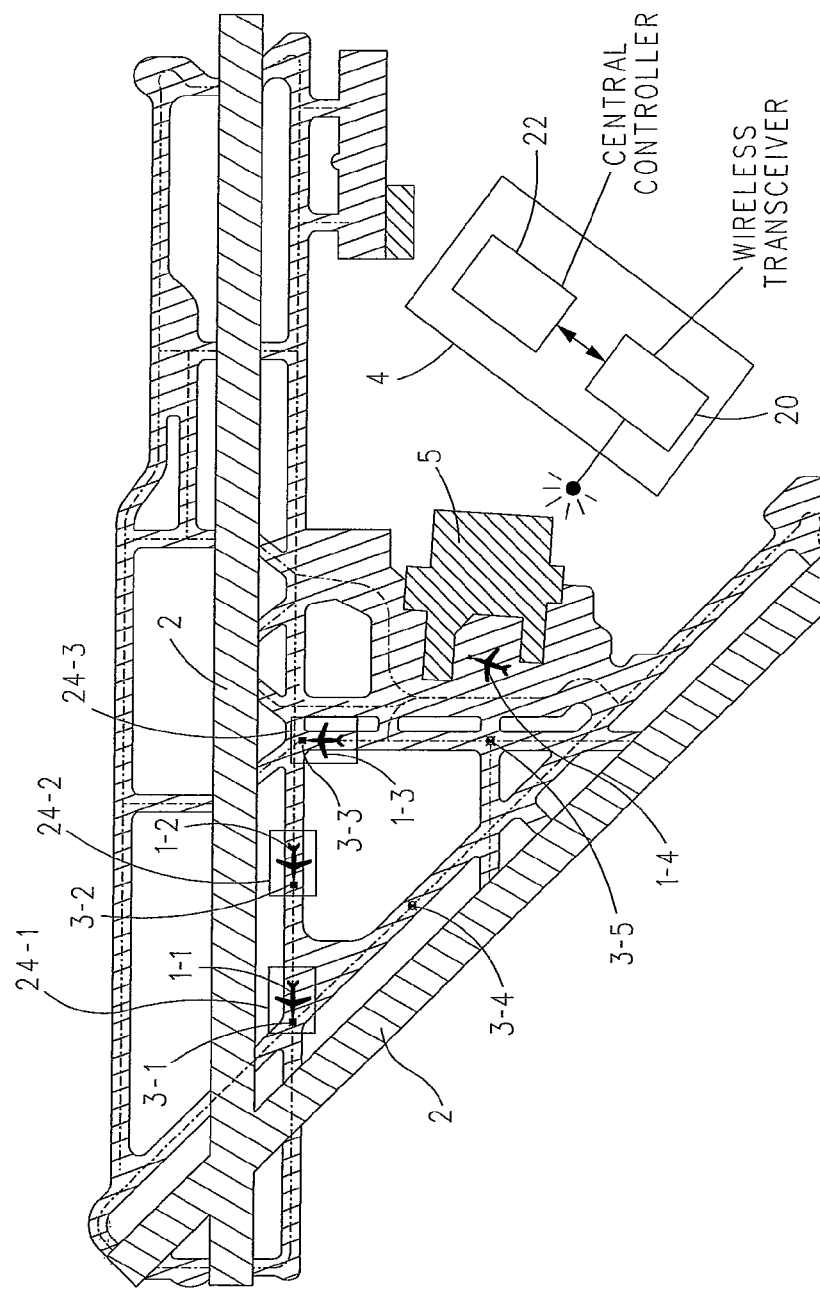
FIG. 1 is an exemplary airport layout including a central control system (e.g., at a control tower) and a number of tug-aircraft combinations including virtual safety zones therearound.
Figure 2:
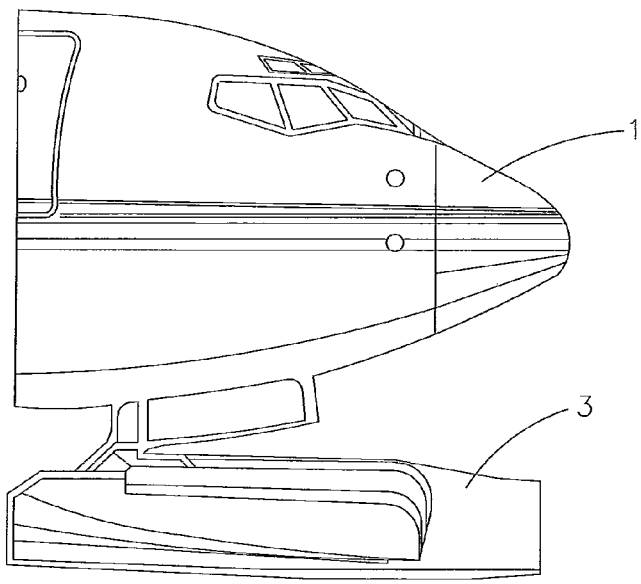
FIG. 2 is a side view of an external tug coupled to front wheels of an aircraft.

With reference to FIGS. 1 and 2, a method and system for controlling the movement of aircraft 1 between airport terminal gates 5 and an active runway 2 includes aircraft tugs 3 (hereinafter "tug" or "tugs") and a central control system 4 for coordinating the movement of each standalone tug and tug propelled or towed aircraft (also known as a tug-aircraft combination) on the grounds of an airport.

Figure 3:
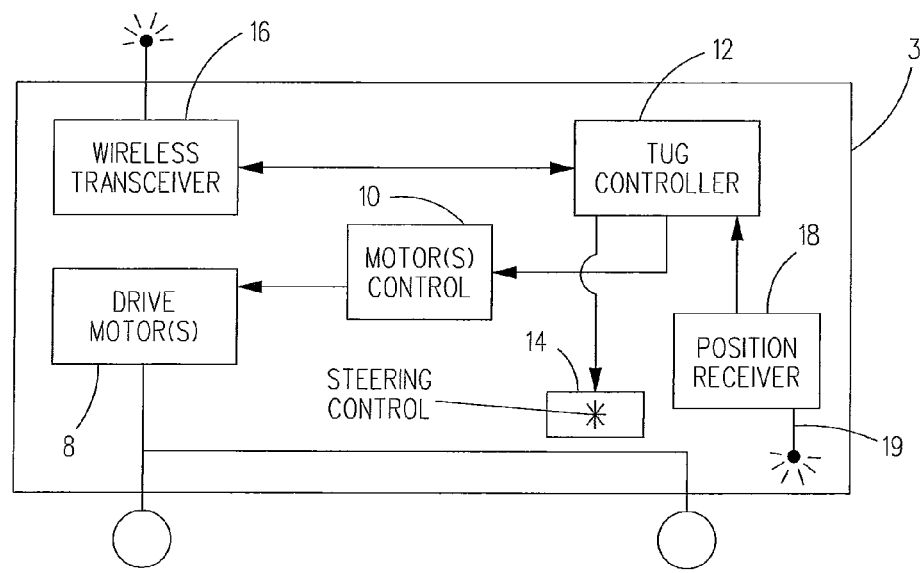
FIG. 3 is a block diagram of the internal components of the tug of FIG. 2.

With reference to FIG. 3 and with continuing reference to FIGS. 1 and 2, each tug 3 includes one or more gas or electric powered drive motors 8 operating under the control of a motor(s) control 10 which is responsive to commands output by a tug controller 12 for controlling drive motors 8 to propel tug 3 in a desired manner. Tug 3 also includes a steering control 14 operating under the control of tug controller 12 to effect steering of tug 3 in a desired manner.

Tug 3 also includes a radio transceiver 16 coupled to tug controller 12. Radio transceiver 16 is operative for converting incoming wireless radio signals into data that can be processed by tug controller 12 and is further operative for converting data output by tug controller 12 to radio transceiver 16 into wireless radio signals. Lastly, tug 3 includes a position receiver 18 coupled to tug controller 12 and operative for providing information to tug controller 12 regarding the location or position of tug 3.

Position receiver 18 can accomplish position location of tug 3 in any one or a number of manners. For example, position receiver 18 can include one or more of the following: a global positioning system (GPS) receiver which outputs to tug controller 12 GPS data regarding a position of the tug; a light detection and ranging (LIDAR) system which outputs LIDAR data regarding a position of one or more other tugs or tug-aircraft combinations; one or more radio receivers 19 which triangulate radio signals received by said one or more radio receivers 19 from radio transmitters on or about the grounds of the airport; an electromagnetic receiver for detecting one or more current-carrying wires or magnetic position sensors embedded in the runway, the taxiway or both of the airport; and/or an RF receiver for detecting one or more RF transmitters (i.e., RFID tags) on a surface of or embedded in the runway, the taxiway or both of the airport.

Regardless of how position receiver 18 determines the location of tug 3, data regarding the position of tug 3 output to tug controller 12 by position receiver 18 is provided to radio transceiver 16 which wirelessly transfers this position information in a manner known in the art.

Referring back to FIG. 1, central control system 4 includes a radio transceiver 20 and a central controller 22. Under the control of central controller 22, radio transceiver 20 can wirelessly communicate with the radio transceiver 16 of each tug 3. For example, under the control of central controller 22, radio transceiver 20 can establish radio communication with radio transceiver 16 of tug 3-1; can establish radio communication with radio transceiver 16 of tug 3-2; can establish radio communication with radio transceiver 16 of tug 3-3; and so forth for each tug 3-1, 3-2, 3-3, etc. on the grounds of the airport in any suitable and/or desirable manner known in the art.

Via the wireless radio link established between radio transceiver 20 and the radio transceiver 16 of each tug 3, information regarding the position, movement, or both of the tug 3 obtained by the position receiver 18 of said tug 3 can be dispatched to central controller 22 which utilizes said data in the manner described hereinafter to control or facilitate the movement of each standalone tug or tug-aircraft combination on the grounds of the airport.

Each tug 3 is desirably a fully automated, remotely controllable, and attendantless tug which is capable of moving aircraft at relatively high speed. Examples of tugs 3 suitable for use in accordance with the present invention include ones available from Israeli Aerospace Industries Ltd. under the trademark Taxibot® and from Wheeltug PLC under the trademark Wheeltug®. In the U.S., Taxibot® is a registered trademark (Registration No. 3927464) of Israeli Aerospace Industries Ltd., Israel, and Wheeltug® is a registered trademark (Registration No. 3543694) of Borealis Technical Limited Corporation, Gibraltar.

The Taxibot® tug is a robotic tractor that can be remotely controlled to allow both wide and narrow body airplanes or aircrafts to taxi to and from the gate and the runway without using their engines, while remaining under full pilot control at all times and removing all hazards to ground vehicle drivers. The Wheeltug® tug comprises one or more motors disposed in one or more wheels of an airplane or aircraft that can be remotely controlled to taxi the aircraft or airplane both backwards and forwards without the use of external tugs or the engines of the aircraft or airplane. For the purpose of describing the present invention, it will be assumed that each instance of tug 3 is a remotely controlled tractor that is coupleable to the aircraft being towed, like the tug 3 shown coupled to the aircraft 1 in FIG. 2. However, this is not to be construed as limiting the invention since it is envisioned that one or more aircraft can incorporate the functions of a tug into one or wheels of the aircraft in the manner of the Wheeltug® system described above.

Figure 4:
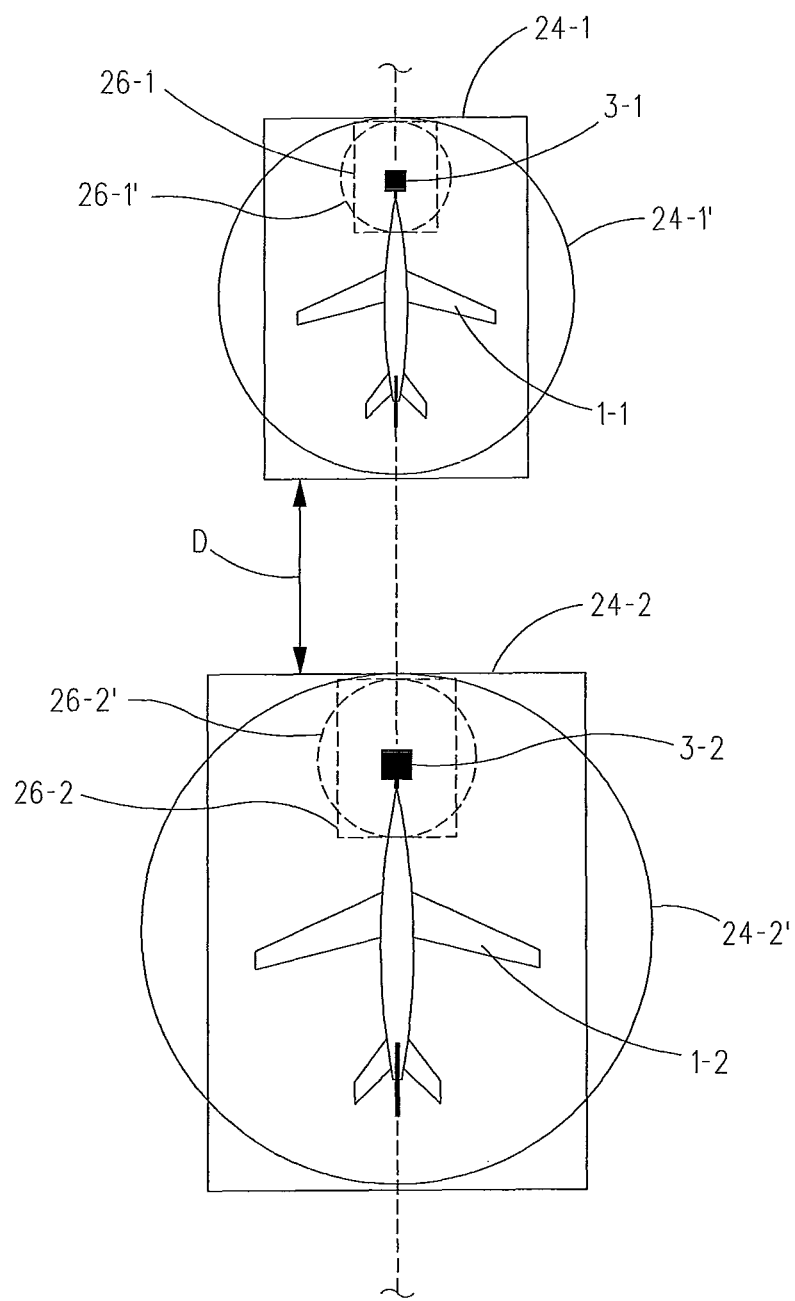
FIG. 4 is a plan view of a pair of the tug-aircraft combinations shown in FIG. 1, including the virtual safety zones around each tug-aircraft combination.

With reference to FIG. 4 and with continuing reference to FIGS. 1-3, a system for navigating standalone tugs and tug towed aircraft (a.k.a., tug-aircraft combinations) on the grounds of an airport includes a plurality of standalone tugs 3-1-3-5. Coupling a standalone tug 3 to an aircraft 1 forms a tug-aircraft combination (3, 1). Three tug-aircraft combinations (3-1, 1-1), (3-2, 1-2), (3-3, 1-3) are shown in FIG. 1.

Each standalone tug 3 includes a position receiver 18, a radio transceiver 16, a steering control 14, and a tug controller 12 which is operative for causing radio transceiver 16 to wirelessly radio transfer data output by position receiver 18 or data generated by tug controller 12 from data output by position receiver 18. This wirelessly transferred data can include information regarding the position, movement, or both of said standalone tug 3 or the tug-aircraft combination comprised of said tug 3.

Central controller 22 is operative for receiving the data that is wirelessly transmitted by the radio transceiver 16 of each tug 3 via radio transceiver 20 of central control system 4. Movement of each standalone tug 3 and each tug-aircraft combination (3, 1) is then controlled based on the wirelessly transmitted data received by central controller 22 from the standalone tugs 3 and the tug-aircraft combinations (3, 1) on the grounds of the airport based on virtual safety zones 24 and 26 defined around each tug-aircraft combination (3, 1) and each standalone tug 3, respectively.

Each virtual safety zone 24 and 26 is a computer defined, two-dimensional virtual space around the respective tug-aircraft combination or standalone tug. For example, as shown in FIG. 4, safety zone 24-1 can be a virtual two-dimensional space electronically defined around tug-aircraft combination (3-1, 1-1). Similarly, safety zone 24-2 can be a virtual two-dimensional space electronically defined around tug-aircraft combination (3-2, 1-2). Safety zones 26-1 and 26-2 can be virtual safety zones electronically defined around tugs 3-1 and 3-2, respectively, when said tugs are standalone tugs that are not coupled to an aircraft.

In FIG. 4, the dimensions of safety zones 24-1 and 24-2 are illustrated as being larger than the dimensions of safety zones 26-1 and 26-2. However, this is not to be construed as limiting the invention since safety zones 24-1 and 24-2 can have the same dimensions as safety zones 26-1 and 26-2. Desirably, however, the dimensions of each safety zone relate to the size of the object surrounded by said safety zone. For example, each standalone tug 3 can have a safety zone, e.g., safety zone 26-1, which can be smaller than the safety zone defined around a tug-aircraft combination (3-1) that includes said standalone tug 3, e.g., safety zone 24-1, which in turn can be smaller than a tug-aircraft combination (3, 1) formed by a tug 3 and an aircraft having larger dimensions, e.g., virtual safety zone 24-2. In other words, each safety zone 24 and 26 can desirably be sized to account for the object or objects surrounded by said safety zone. For example, where tug 3-2 is towing a relatively large aircraft 1-2, e.g., tug-aircraft combination (3-2, 1-2), the virtual zone 24-2 surrounding the combination can be larger than the virtual safety zone 24-1 around tug 3-1 towing a relatively smaller aircraft 1-1, e.g., tug-aircraft combination (3-1, 1-1). Furthermore, the safety zone around each tug-aircraft combination (3, 1) can be larger than the safety zone around a standalone tug 3. Moreover, the virtual safety zone around each standalone tug and/or the virtual safety zone around each tug-aircraft combination can be based on the speed of said tug and/or said tug-aircraft combination. For example, when a tug 3 or a tug-aircraft combination (3, 1) is traveling at a relatively low rate of speed, the dimensions of the virtual safety zone therearound can be smaller than when said tug or said tug-aircraft combination is traveling at a relatively higher rate of speed. In other words, the size of one or more virtual safety zones can change based on the speed of the standalone tug or the tug-aircraft combination, as the case may be, with the understanding that a faster moving vehicle (tug or tug-aircraft combination) requires greater time to stop than a slower moving vehicle.

It is to be understood that each computer defined virtual safety zone 24 and 26 is an electronic representation of a physical space around the corresponding tug-aircraft combination or standalone tug that resides in a memory of tug controller 12, a memory of central controller 22, or both. The dimensions of each virtual safety zone 24 and 26 can be established by the tug controller 12 of the corresponding tug-aircraft combination or standalone tug, or by central controller 22.

The shape of each virtual safety zone 24 and 26 can be selected to be any desired two-dimensional shape. For example, each virtual safety zone, e.g., 24-1, 24-2, 26-1, and 26-2 can be a rectangle (as shown in FIG. 4), a circle 24-1', 24-2', 26-1', and 26-2', an oval, or any other suitable and/or desirable shape. Moreover, different virtual safety zones can have different shapes.

Each virtual safety zone 24 and 26 can have the same dimensions. Alternatively, at least one dimension of at least one virtual safety zone 24 or 26 can be based on at least one dimension of the aircraft of a tug-aircraft combination or at least one dimension of a standalone tug. For example, as shown in FIG. 4, the length and width of aircraft 1-1 are smaller than the length and width of aircraft 1-2. Accordingly, safety zone 24-1 associated with tug-aircraft combination (3-1, 1-1) can have smaller dimensions than the safety zone 24-2 associated with tug-aircraft combination (3-2, 1-2). Similarly, safety zones 26-1 and 26-2 associated with standalone tugs 3-1 and 3-2 can have smaller dimensions than safety zone 24-1 and 24-2. However, this is not to be construed as limiting the invention since it is envisioned that the dimensions of each safety zone 24 and 26 can be the same or different as deemed suitable and/or desirably by one skilled in the art.

The dimensions of each virtual safety zone can be established in any suitable or desirable manner by the tug controller 12 associated with said safety zone, central controller 22, or both in coordination with each other. For example, a tug controller 12 of a tug 3 can be programmed to recognize when said tug 3 is acting as a standalone tug or as the tug of a tug-aircraft combination, e.g., by way of a sensor (not shown) coupled to tug controller 12 and configured to detect when tug 3 is coupled or uncoupled from an aircraft 1.

Once a virtual safety zone 24 and 26 has been electronically defined (as necessary) around each tug-aircraft (3, 1) combination and/or each standalone tug 3, the position, movement, or both of each vehicle, albeit a tug-aircraft (3, 1) combination or a standalone tug 3, and its virtual safety zone on the grounds of the airport can be electronically monitored and controlled based on the electronically monitored position, movement, or both of all of the tug-aircraft (3, 1) combinations and all of the standalone tugs 3 on the grounds of the airport, determined based on position data output by the position receiver 18 of each tug-aircraft combination and each standalone tug, to avoid overlap of two or more safety zones. Optionally, a virtual safety zone can be electronically defined around each of one or more assets of the airport, such as, a building, a structure, a fence, a wall, a gate, or some combination thereof, whereupon movement of one or more standalone tugs 3, one or more tug-aircraft combinations (3, 1), or some combination thereof on the grounds of the airport can also be based on the virtual safety zones defined around said assets. Hereinafter, the discussion will focus on virtual safety zones 24-1 and 24-2 shown in FIG. 4. However, this is not to be construed as limiting the invention since it is envisioned that the concepts described hereinafter are applicable to the virtual safety zones around any vehicle or asset.

In a first embodiment, the movement of each tug-aircraft combination and each standalone tug can be controlled from central control system 4. In a second embodiment, each tug-aircraft combination and each standalone tug controls its own movement based on the position, the movement, or both of one or more other tug-aircraft combination(s) and/or one or more standalone tugs received from central control system 4.

In the first embodiment, where movement of each tug-aircraft combination and each standalone tug is controlled from central control system 4, under the control of the tug controller 12 thereof the position, movement, or both of each tug 3 (albeit a standalone tug or the tug of a tug-aircraft combination) obtained or determined from data received from the position receiver 18 of said tug 3 is dispatched via the radio transceiver 16 of said tug 3 to the radio transceiver 20 of central control system 4 for processing by central controller 22. Desirably, this dispatch of position data, movement data, or both occurs at a sufficient rate that enables central controller 22 to exercise substantially real time control of said tug 3 or the tug-aircraft (3, 1) combination that includes said tug 3.

Based on the position data, movement data, or both of each tug-aircraft (3, 1) combination and each standalone tug 3 on the grounds of the airport, central controller 22 can control the movement of the tug-aircraft combinations and the standalone tugs to avoid overlap of two or more safety zones. For example, with reference to tug-aircraft combinations (3-1, 1-1) and (3-2, 1-2) associated with safety zone 24-1 and 24-2, respectively, shown in FIGS. 1 and 4, central controller 22 can control (via movement commands) the movement of these tug-aircraft combinations (3-1, 1-1) and (3-2, 1-2) in a manner that avoids overlap of safety zones 24-1 and 24-2. Desirably, central controller 22 maintains a minimum safety distance D between safety zones that are in close proximity to each other.

In response to two (or more) safety zones 24 and/or 26 becoming overlapped, central controller 22 can control the tugs associated with the overlapping safety zones 24 and/or 26 (albeit one or more standalone tugs and/or one or more tug-aircraft combinations) to move to a state where said safety zones 24 and/or 26 become non-overlapping. More specifically, by way of radio transceiver 20, central controller 22 can dispatch movement commands to each tug 3 controller 12 via the corresponding radio transceiver 16 and can receive information about the position, movement, or both of said tug 3 in order to effect substantially real-time control of the movement of each standalone tug and tug-aircraft combination on the grounds of the airport to avoid or undo overlapping safety zones.

Desirably, central controller 22 can maintain in a memory thereof a substantially real-time virtual map of the position, movement, or both of each standalone tug and each tug-aircraft combination on the grounds of the airport, based on position data, movement data, or both received from each standalone tug and the tug of each tug-aircraft combination, and can control the movement of each standalone tug and each tug-aircraft combination based on this data and the virtual safety zone 24 and 26 defined around each tug-aircraft combination and each standalone tug in a manner that facilitates the safe and effective movement thereof on the grounds of the airport, e.g., shown in FIG. 1, between airport terminal gates 5 and a runway 2 of the airport, or vice versa. Each tug-aircraft combination (3, 1) and its safety zone 24 and each standalone tug 3 and its safety zone 26 can be represented as an icon on the virtual map. Desirably, the safety zone 24 around each tug-aircraft combination is represented by the size of the icon for said tug-aircraft combination on the virtual map of the grounds of the airport. Thus, for example, because safety zone 24-1 is smaller than safety zone 24-2 in FIG. 4, the icon for the tug-aircraft combination associated with safety zone 24-1 in the virtual map can be smaller than the icon for the tug-aircraft combination associated with safety zone 24-2 in the virtual map. It is envisioned that central controller 22 can optionally include a display for visually displaying a separate icon for each standalone tug 3 and each tug-aircraft combination (3, 1) on a visual representation of the virtual map of the grounds of the airport residing in a memory of central controller 22.

Desirably, each standalone tug or the tug of each tug-aircraft combination receives from central controller 22 data that the corresponding tug controller 12 interprets and converts into command signals that tug controller dispatches to its motor(s) control 10 and steering control 14 to facilitate movement of the standalone tug or the tug-aircraft combination until it reaches a pre-determined location. Prior to reaching this pre-determined location, each standalone tug or each tug of a tug-aircraft combination can receive subsequent instructions from central controller 22 that can be implemented by the corresponding tug controller 12 at the conclusion of the present set of instructions. It is envisioned that each standalone tug or the tug of each tug-aircraft combination receives from central controller 22 sufficient instructions to enable said tug to move to one or more desired locations on the grounds of the airport. Upon completion of moving to a desired location, and in the absence of receiving further movement instructions from central controller 22, said standalone tug or the tug of a tug-aircraft combination will cease movement awaiting further movement instructions from central controller 22. However, this is not to be construed as limiting the invention since it is also envisioned that a number of sequential movement instructions can be dispatched from central controller 22 to each standalone tug or the tug of each tug air-craft combination to facilitate continuous movement thereof on the grounds of the airport. Of course, an incoming instruction to a tug can include a code that the corresponding tug controller 12 recognizes as an emergency instruction that overrides any instructions that are presently being executed or are in a queue for execution by the tug controller for safety purposes.

In order to facilitate the unique control of each standalone tug or the tug of a tug-aircraft combination, each tug is assigned a unique tug address. Via the unique tug address thereof, each tug, albeit a standalone tug or the tug of a tug-aircraft combination, can establish a wireless communication link with central controller 22 which can individually address each tug utilizing its unique tug address. The use of a unique tug address is common to all of the embodiments described herein to facilitate secure communication between each standalone tug or the tug of each tug-aircraft combination with central controller 22.

Optionally, each tug 3 can include a virtual map of the position of said tug on the grounds of the airport, wherein said virtual map offers primary guidance coordinates for said tug. The tug can utilize any additional position measurement to either reference its position on the virtual map or to remove any accumulated position error due to various factors, such as wheel slippages, tire wear, etc. The tug 3 may further reference the virtual map in collaboration with a route planner (not shown). For example, while the virtual map may show all of the possible paths the tug can take, the route planner provides more specific information that will allow the tug to navigate from an origin to a destination.

Where a tug operates under the control of electric powered drive motors 8, said tug may also include suitable electrical storage means, such as batteries, capacitors, and the like, for storage of electrical energy that is utilized by said electric powered drive motors 8 during the operation of said tug. If desired, said tug can include means for the contactless transfer of electrical energy to said storage means. The use of such an arrangement avoids inherent danger associated with fuel storage on tugs while offering tugs an unlimited duration of operation. Such an implementation may be suited for new airport installations even though a retrofit to an existing airport is also possible.

Desirably, each tug 3 is operable for automated coupling and uncoupling from an aircraft as needed. Optionally, the coupling or uncoupling may be handled in conjunction with the pilot on board the aircraft. In yet another option, the pilot may have the ability to uncouple the tug at any point in time, such as an emergency situation, e.g., the tug is towing the aircraft to an improper location. Optionally, the pilot uncoupling the tug from an aircraft may result in a standstill mode, whereupon all of the standalone tugs and/or tug-craft combinations assume a stopped state, until the emergency condition is resolved.

In the second embodiment, where each tug (albeit a standalone tug or the tug of a tug-aircraft combination) controls its own movement based on position data, movement data, or both of at least one other standalone tug or tug-aircraft combination, each standalone tug and the tug of each tug-aircraft combination (3, 1) dispatches its position data, movement data, or both to central controller 22 via its radio transceiver 16 and radio transceiver 20 of central control system 4. At suitable times, central controller 22 then dispatches to the radio transceiver 16 of each standalone tug and the tug of each tug-aircraft combination (via radio transceiver 20) position data, movement data, or both of at least one other standalone tug or tug-aircraft combination. For example, each tug 3-1-3-5 radio transmits via its respective radio transceiver 16 position data, movement data, or both of itself (tugs 3-4 and 3-5) or its tug-aircraft combination (3-1, 1-1), (3-2, 1-2) and (3-3, 1-3) to central controller 22 via radio transceiver 20. At suitable times, central controller 22 dispatches to each standalone tug and each tug-aircraft combination the position data, movement data, or both of at least one other standalone tug or tug-aircraft combination. For example, at suitable times, central controller 22 dispatches to tug-aircraft combination (3-1, 1-1) the position data, movement data, or both of standalone tugs 3-4 and 3-5 and tug-aircraft combinations (3-2, 1-2), and (3-3, 1-3). Hence, the tug controller 12 of each standalone tug and the tug of each tug-aircraft combination (3, 1) will have available (via its position receiver 18) its position data, movement data, or both along with the position data, movement data, or both of at least one other standalone tug or tug-aircraft combination. Desirably, central controller 22 dispatches to each standalone tug or the tug of each tug-aircraft combination, the position data, movement data, or both of all of the standalone tug and tug-aircraft combinations on the grounds of the airport.

Regardless of how each standalone tug or the tug of each tug-aircraft combination gets the position data, movement data, or both of one or more or all of the standalone tugs and tug-aircraft combinations on the grounds of the airport, in this second embodiment each standalone tug and each tug-aircraft combination (via the tug thereof) can control its own movement based on the position data, the movement data, or both of the one or more or all of the standalone tugs and tug-aircraft combinations and, especially, the virtual safety zones electronically defined therearound. More specifically, each standalone tug and the tug of each tug-aircraft combination can maintain its own virtual map of the position, movement, or both of all of the standalone tugs and tug-aircraft combinations and their safety zones 26 and 24 on the grounds of the airport. Based on this information, each standalone tug and each tug-aircraft combination can move on the grounds of the airport in a manner that avoids overlapping two or more safety zones 24 and/or 26. In the event of an overlap of two or more safety zones, the tugs associated with the overlapping safety zones can be programmed or controlled, e.g., via central controller 22, to move in a manner to cause the two safety zones 24 and/or 26 to become non-overlapping.

The foregoing description of the first and second embodiments assumed that the combination of standalone tugs and tug-aircraft combinations were moving on the grounds of the airport. However, this is not to be construed as limiting the invention since it is envisioned that the invention is applicable to the controlled movement of standalone tugs without the movement of any tug-aircraft combinations, or the movement of tug-aircraft combinations on the grounds of the airport without the movement of any standalone tugs on the grounds of the airport. Accordingly, the foregoing description of the controlled movement of the combination of standalone tugs and tug-aircraft combinations on the grounds of the airport is not to be construed as limiting the invention.

Desirably, the position, movement, or both of all of the standalone tugs and tug-aircraft combinations on the grounds of the airport can be communicated to each standalone tug and the tug of each tug-aircraft combination in a manner that facilitates safe and efficient movement of all of the standalone tugs and tug-aircraft combinations on the grounds of the airport. Desirably, the position, movement, or both of each tug-aircraft combination and safety zone 24 on the grounds of the airport can be updated substantially in real-time on the virtual map in the memory of the corresponding tug controller 12 to facilitate the safe and efficient movement of said tug-aircraft combination on the grounds of the airport in concert with the movement of other tugs and/or tug-aircraft combinations. Similarly, the position, movement, or both of each standalone tug 3 and its safety zone 26 can be updated substantially in real-time on the virtual map in the memory of the corresponding tug controller 12 to facilitate the safe and efficient movement of said standalone tug on the grounds of the airport in concert with the movement of other tugs and/or tug-aircraft combinations.

In this second embodiment, each safety zone can be electronically defined around the corresponding tug-aircraft combination or standalone tug by central controller 22 or by the corresponding tug controller 12. Where the safety zone around a tug-aircraft combination or standalone tug is defined by the corresponding tug controller 12, information regarding this safety zone can be radio transmitted to central controller 22 via the radio transceiver 16 of the corresponding tug and the radio transceiver 20 of central control systems 4.

Central controller 22 can be operative for receiving and at least temporarily storing the safety zone data that is radio transmitted by the radio transceiver 16 of each standalone tug and the tug of each tug-aircraft combination. At suitable times, central controller 22 can dispatch safety zone data regarding each standalone tug and each tug-aircraft combination to all of the standalone tugs and the tugs of all of the tug-aircraft combinations. For example, central controller 22 can dispatch information regarding a safety zone of each standalone tug and each tug-aircraft combination to all of the standalone tugs and the tugs of all of the tug-aircraft combinations at the same time it transmits position data, movement data, or both of all of the standalone tugs and the tugs of all of the tug-aircraft combinations to each standalone tug and the tug of each tug-aircraft combination. If desired, central controller 22 can withhold the dispatch to each standalone tug or to the tug of each tug-aircraft combination the safety zone data received therefrom to avoid the dispatch of unnecessary data.

As can be seen, the present invention is a system and method for navigating standalone tugs and/or tug towed aircraft on the grounds of an airport. In the system, a plurality of vehicles, consisting of one or more standalone tugs and/or one or more tug-aircraft combinations are provided, wherein each vehicle includes a position receiver, a radio transceiver, and a controller that is operative for causing position data output by the position receiver to be radio transmitted by the radio transceiver. A central controller is operative for receiving the position data that is radio transmitted by the radio transceiver of each vehicle. Movement of each of the plurality of vehicles is controlled by the central controller, the controller of said vehicle, or both in combination, based on the radio transmitted position data received by the central controller from the plurality of vehicles and based on virtual safety zones computer defined around the plurality of vehicles.

The safety zone for each vehicle is a virtual safety zone that can be electronically defined by the central controller or by the controller of said vehicle.

Position data, movement data, or both of each vehicle in response to movement thereof can be electronically monitored and movement of the plurality of vehicles can be controlled based on the electronically monitored position data, movement data, or both of each vehicle in a manner that avoids overlap of two or more safety zones.

If it is electronically determined that two or more virtual safety zones are overlapping, the vehicles associated with said two or more virtual safety zones can be controlled or operated to avoid physical contact between said vehicles. Also or alternatively, two or more virtual safety zones can be controlled to move to a state where the two safety zones become non-overlapping.

Desirably, a virtual map of the position, movement, or both of each vehicle is created and maintained in a memory of central controller 22, a memory of each controller 12, or both. Desirably, this virtual map is updated in substantially real-time to reflect the position, movement, or both of each vehicle on the grounds of the airport since a last update. However, this is not to be construed as limiting the invention since it is envisioned that the movement of each vehicle can be managed by suitable algorithms present in central controller 22, each controller 12, or both that avoids overlap of safety zones while facilitating safe and effective movement of vehicles on the grounds of the airport.

The position, movement, or both of each vehicle can be updated on the virtual map in any suitable or desirable manner and/or timeframe.

The virtual map can reside in a memory of central controller 22, in a memory of each controller 12, or both as deemed suitable and/or desirable. In the first embodiment where central controller 22 controls the movement of each vehicle, central controller 22 controls the movements of the vehicles on the grounds of the airport by way of wireless transmissions between radio transceiver 20 and the radio transceivers 16 of the vehicles. Desirably, each vehicle updates central controller 22 with information regarding its position, movement, or both at a sufficient rate to enable central controller 22 to effect substantially real-time control of the movement of each vehicle on the grounds of the airport.

In the second embodiment where each vehicle consisting of a standalone tug or a tug-aircraft combination controls its own movement on the grounds of the airport, said movement is controlled based upon updates to virtual map of the positions, movements, or both of all of the vehicles consisting of one or more standalone tugs and/or one or more tug-aircraft combinations on the grounds of the airport provided by central controller 22. To enable the virtual maps residing in the memory of the controller 12 of each vehicle, each vehicle dispatches information regarding its position, movement, or both obtained from or derived from data received by the position receiver 18 thereof to central controller 22 which consolidates this data for incorporation onto the virtual map residing in said controller 12. In one embodiment, it is envisioned that the virtual map with icons representing vehicles consisting of one or more tugs and/or one or more tug-aircraft combinations residing in each controller 12 can be replaced with a new virtual map by central controller 22 at suitable times to effect the safe movement of each on the grounds of the airport. Also or alternatively, central controller 22 can simply update the virtual map already residing in the memory of each controller 12 on the grounds of the airport with updated information regarding the position, movement, or both of all of the vehicles consisting of one or more tugs and/or one or more tug-aircraft combination on the grounds of the airport. Based on either each new virtual map supplied by central controller 22 or the updated information regarding the position, movement, or both of all of the vehicles on the grounds of the airport, each controller 12 can, with reference to each new virtual map or updated virtual map, facilitate the safe and effective movement of its vehicle around the grounds of the airport in a manner that avoids overlap of two or more safety zones.

Desirably, the position of all of the functioning tugs on the grounds of the airport are tracked in substantially real-time. Each functioning tug may not know the relative position of each other tug. However, central controller 22 can obtain the relative position of the tugs on the grounds of the airports, regardless of whether or not the tug is coupled to an aircraft, so that central controller 22 can route each tug safely between an origin and a destination. For example, the origin for a tug 3 may be a holding location for the tug and the destination may be a particular gate location where an aircraft is already parked. In another example, the origin may be a gate location and the destination may be the entry point of a main runway for takeoff. In yet another example, the origin may be an exit point off of a main runway and the destination may be a gate location. Similarly, tugs may be moved from any location on the grounds of the airport to another location on the grounds of the airport. It should also be appreciated that the tugs, and alternate embodiments, may also be used to transport other equipment between an origin and a destination. Non-limiting examples include baggage trains and carts, fuel vehicles, and the transport of aircraft between a tarmac location and a maintenance hangar.

The invention has been described with reference to exemplary embodiments. Obvious modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A method of navigating a plurality of vehicles consisting of one or more standalone tugs, or one or more tug propelled aircraft, or some combination thereof on the grounds of an airport, the method comprising:
    (a) electronically defining around each vehicle a virtual safety zone;
    (b) electronically controlling movement of each vehicle on the grounds of an airport based on the virtual safety zones defined around the plurality of vehicles; and
    (c) electronically redefining at least one dimension of one virtual safety zone based on a sensor detecting that the vehicle associated with said one virtual safety zone changes from a standalone tug to a tug propelled aircraft, or vice versa, wherein the sensor is coupled to a controller of the tug.

2. The method of claim 1, wherein each vehicle consisting of a tug propelled aircraft is formed by mechanically coupling a tug having a tug virtual safety zone to an aircraft to form said vehicle having the electronically defined virtual safety zone of step (a) therearound.

3. The method of claim 1, further including electronically defining a virtual safety zone around each of one or more assets of the airport, wherein step (b) further includes electronically controlling movement of each vehicle on the grounds of an airport based on the virtual safety zone defined around each of the one or more assets of the airport.

4. The method of claim 3, wherein each asset of the airport includes one of the following: a building, a structure, a fence, a wall, a gate, or some combination thereof.

5. The method of claim 1, wherein at least one dimension of at least one virtual safety zone defined around a vehicle changes based on a speed of said vehicle.

6. The method of claim 1, wherein step (b) includes electronically controlling movement of each vehicle to avoid overlap of virtual safety zones of two or more vehicles.

7. The method of claim 1, further including:
    (d) electronically determining when the virtual safety zones of two vehicles overlap; and
    (e) in response to step (d), electronically controlling said vehicles having the overlapping virtual safety zones to avoid physical contact.

8. The method of claim 1, wherein step (b) includes electronically controlling movement of the plurality of vehicles from a central control location based on position data, movement data, or both of the plurality of vehicles.

9. The method of claim 1, wherein step (b) includes each vehicle electronically controlling its movement based on position data, movement data, or both of at least one other vehicle received from a central control location.

10. The method of claim 1, wherein:
    each virtual safety zone has the same dimensions; or
    at least one dimension of the virtual safety zone around each vehicle is based on at least one dimension of the vehicle.

11. The method of claim 1, wherein each virtual safety zone is an electronically defined two-dimensional space around the vehicle.

12. The method of claim 11, wherein the virtual safety zone around each vehicle electronically moves with movement of said vehicle.

13. A method of navigating a plurality of vehicles consisting of one or more standalone tugs, one or more tug propelled aircraft, or some combination thereof on the grounds of an airport, the method comprising:
    (a) electronically defining a virtual safety zone around each of a plurality of vehicles;
    (b) electronically monitoring position, movement, or both of each vehicle on the grounds of an airport;
    (c) controlling movement of the plurality of vehicles on the grounds of the airport based on the electronically monitored position, movement, or both of each vehicle on the grounds of the airport in step (b) to avoid overlap of two or more virtual safety zones; and
    (d) electronically redefining at least one dimension of one virtual safety zone based on a sensor detecting that the vehicle associated with said one virtual safety zone changes from a standalone tug to a tug propelled aircraft, or vice versa, wherein the sensor is coupled to a controller of the tug.

14. The method of claim 13, wherein:
    step (a) includes electronically defining a virtual safety zone around an asset of the airport; and
    step (c) includes controlling movement of the plurality of vehicles on the grounds of the airport based on the electronically defined virtual safety zone around the asset of the airport.

15. The method of claim 14, wherein the asset of the airport includes: a building, a structure, a fence, a wall, a gate, or some combination thereof.

16. The method of claim 13, wherein at least one dimension of at least one virtual safety zone defined around a vehicle changes based on a speed of said vehicle.

17. The method of claim 13, wherein step (c) includes either:
- movement of the plurality of vehicles being controlled from a central location; or
- each vehicle controlling its movement based on the position, the movement, or both of at least one other vehicle received from a central location.

18. The method of claim 13, wherein step (b) includes electronically monitoring from a central location.

19. The method of claim 13, further including:
(e) in response to two virtual safety zones overlapping, the two vehicles associated with the two overlapping virtual safety zones moving so that the two virtual safety zones become non-overlapping.

20. The method of claim 13, wherein:
- each virtual safety zone has the same dimensions; or
- at least one dimension of the virtual safety zone around each vehicle is based on at least one dimension of the vehicle.

21. A system for navigating vehicles consisting of one or more standalone tugs, one or more tug propelled aircraft, or some combination thereof on the grounds of an airport comprising:
- a plurality of vehicles, each vehicle including a position receiver, a radio transceiver and a controller that is operative for causing position data output by the position receiver to be radio transmitted by the radio transceiver; and
- a central controller operative for receiving the position data that is radio transmitted by the radio transceiver of each vehicle, wherein movement of each of the plurality of vehicles is controlled by the central controller, the controller of said vehicle, or both based on the radio transmitted position data received by the central controller from said plurality of vehicles and based on a virtual safety zone electronically defined around each vehicle, wherein at least one dimension of one virtual safety zone is electronically redefined based on a sensor detecting that the vehicle associated with said one virtual safety zone changes from a standalone tug to a tug propelled aircraft, or vice versa, wherein the sensor is coupled to a controller of the tug.

22. The system of claim 21, wherein movement of each of the plurality of vehicles is further controlled based on a virtual safety zone electronically defined around one or more assets of the airport.

23. The system of claim 22, wherein each asset includes: a building, a structure, a fence, a wall, a gate, or some combination thereof.

24. The method of claim 21, wherein at least one dimension of at least one virtual safety zone defined around a vehicle changes based on a speed of said vehicle.

25. The system of claim 21, wherein the virtual safety zone around each vehicle is electronically defined or redefined by the central controller.

26. The system of claim 21, wherein:
- the controller of each vehicle electronically defines or redefines the virtual safety zone around said vehicle and causes information regarding said virtual safety zone to be radio transmitted by the radio transceiver; and
- the central controller is operative for receiving the virtual safety zone data that is radio transmitted by the radio transceiver of the vehicle.

27. The system of claim 21, wherein each virtual safety zone represents a two-dimensional space around the vehicle.

28. The system of claim 21, wherein at least one dimension of the virtual safety zone around each vehicle is based on at least one dimension of the vehicle.

29. The system of claim 21, wherein the movement of each of the plurality of vehicles is controlled to avoid overlap of two or more virtual safety zones.

30. The system of claim 21, wherein the movement of each of the plurality of vehicles is controlled whereupon, in response to two virtual safety zones overlapping, the two vehicles associated with the overlapping virtual safety zones move such that the two virtual safety zones become non-overlapping.

* * * * *

UNITED STATES PATENT AND TRADEMARK OFFICE
CERTIFICATE OF CORRECTION

| | | |
|---|---|---|
| PATENT NO. | : 8,694,238 B2 | Page 1 of 1 |
| APPLICATION NO. | : 13/352755 | |
| DATED | : April 8, 2014 | |
| INVENTOR(S) | : Sathya Vagheeswar Venkatasubramanian | |

It is certified that error appears in the above-identified patent and that said Letters Patent is hereby corrected as shown below:

In the Claims

Column 16, Line 11, Claim 24, delete "method" and insert -- system --

Signed and Sealed this
Twenty-second Day of July, 2014

Michelle K. Lee
*Deputy Director of the United States Patent and Trademark Office*